United States Patent
Lu et al.

(10) Patent No.: US 11,873,981 B2
(45) Date of Patent: Jan. 16, 2024

(54) POWER SYSTEM CAPABLE OF PREVENTING FROM MISTAKENLY TRIGGERING ELECTRIC SHOCK PROTECTION FUNCTION OF LAMP TUBES AND METHOD THEREOF

(71) Applicant: Xiamen PVTECH Co., Ltd., Fujian (CN)

(72) Inventors: Fuxing Lu, Fujian (CN); Rongtu Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/521,872

(22) Filed: Nov. 9, 2021

(65) Prior Publication Data
US 2023/0097241 A1    Mar. 30, 2023

(30) Foreign Application Priority Data

Sep. 30, 2021  (CN) .......................... 202111164012.4

(51) Int. Cl.
*F21V 25/02*   (2006.01)
*H05B 45/50*   (2022.01)
*H05B 45/54*   (2020.01)
*F21Y 103/10*  (2016.01)
*F21Y 115/10*  (2016.01)

(52) U.S. Cl.
CPC ............. *F21V 25/02* (2013.01); *H05B 45/50* (2020.01); *H05B 45/54* (2020.01); *F21Y 2103/10* (2016.08); *F21Y 2115/10* (2016.08)

(58) Field of Classification Search
CPC .......... F21V 25/02; H05B 45/50; H05B 45/54
See application file for complete search history.

(56) References Cited

U.S. PATENT DOCUMENTS

2009/0091950 A1* 4/2009 Chao .................. H02M 3/155
                                                    363/59
2019/0264879 A1* 8/2019 Xiong .................. F21K 9/272

* cited by examiner

*Primary Examiner* — Evan P Dzierzynski
*Assistant Examiner* — Nathaniel J Lee
(74) *Attorney, Agent, or Firm* — Winston Hsu

(57) ABSTRACT

A power system capable of preventing from mistakenly triggering an electric shock protection function of a lamp tube and the method thereof is provided. The power system includes a live wire input end, a neutral wire input end and a capacitive component. The live wire input end is connected to a first node; the first node is used to connect to the live wire terminal of the electric shock protection circuit of a first light-emitting module. The neutral wire input end is connected to a second node; the second node is used to connect to the neutral wire terminal of the electric shock protection circuit of the first light-emitting module. One end of the capacitive component is connected to the first node and the other end thereof is connected to the second node.

4 Claims, 6 Drawing Sheets

POWER SYSTEM CAPABLE OF PREVENTING FROM MISTAKENLY TRIGGERING ELECTRIC SHOCK PROTECTION FUNCTION OF LAMP TUBES AND METHOD THEREOF

BACKGROUND OF THE INVENTION

1. Field of the Invention

The present invention relates to a power system and the method thereof.

2. Description of the Prior Art

The length of a light-emitting diode (LED) lamp tube is about 600 mm-2400 mm. As shown in FIG. 1, when a user U installs an LED lamp tube D on a lamp holder, the user U usually inserts one end of the LED lamp tube D into the live wire input end L of the lamp holder first and holds the other end of the LED lamp tube D (E stands for the ground). In this case, if the LED lamp tube D has no a proper electric shock protection mechanism, the user U may get electric shock. In order to solve the above problem, the LED lamp tube D needs an electric shock protection circuit for providing an electric shock protection function. The electric shock protection circuit can effectively detect whether a human body resistance is connected to the power grid, so can effectively realize the electric shock protection function in order to reduce the risk that the user U gets electric shock. However, the lengths of the wires connecting the LED lamp tube D to the power grid and the quantity of the lamp tubes in the power grid may cause the electric shock protection circuit to be mistakenly triggered. After the electric shock protection circuit is mistakenly triggered, the electric shock protection circuit immediately disconnects the LED lamp tube D from the power grid, so the LED lamp tube D cannot normally operate.

SUMMARY OF THE INVENTION

One embodiment of the present invention provides a power system capable of preventing from mistakenly triggering an electric shock protection function of a lamp tube, which includes a live wire input end, a neutral wire input end and a capacitive component. The live wire input end is connected to a first node; the first node is used to connect to the live wire terminal of the electric shock protection circuit of a first light-emitting module. The neutral wire input end is connected to a second node; the second node is used to connect to the neutral wire terminal of the electric shock protection circuit of the first light-emitting module. One end of the capacitive component is connected to the first node and the other end thereof is connected to the second node.

In one embodiment, the power system further includes at least one second light-emitting module connected to the first light-emitting module in parallel.

In one embodiment, the first light-emitting module and the second light-emitting module are light-emitting diode (LED) lamp tubes.

In one embodiment, the power system further includes a voltage transformation module. The live wire input end and the neutral wire input end are connected to the first node and the second node via the voltage transformation module respectively.

In one embodiment, when the live wire input end is connected to the live wire terminal via the first node and the neutral wire input end is connected to the neutral wire terminal via the second node, the capacitive component discharges the current sampling point of the electric shock protection circuit.

In another embodiment of the present invention provides a method for preventing from mistakenly triggering an electric shock protection function of a lamp tube, which includes the following steps: connecting one end of a capacitive component to the first node of the live wire input end of a power system; connecting the other end of the capacitive component to the second node of the neutral wire input end of the power system; and connecting the first node of the live wire input end to the live wire terminal of the electric shock protection circuit of a first light-emitting module, and connecting the second node of the live wire input end to the neutral wire terminal of the electric shock protection circuit of the first light-emitting module.

In one embodiment, the method further includes the following step: connecting at least one second light-emitting module to the first light-emitting module, wherein the at least one second light-emitting module is connected to the first light-emitting module in parallel.

In one embodiment, the first light-emitting module and the second light-emitting module are LED lamp tubes.

In one embodiment, the method further includes the following step: discharging the current sampling point of the electric shock protection circuit via the capacitive component when the live wire input end is connected to the live wire terminal via the first node and the neutral wire input end is connected to the neutral wire terminal via the second node.

In one embodiment, the live wire input end and the neutral wire input end are connected to the first node and the second node via a voltage transformation module respectively.

As described above, the power system and the method thereof according to the embodiments of the present invention may have the following advantages:

(1) According to one embodiment of the present invention, the power system has a capacitive component; one end of the capacitive component is connected to the live wire input end of the power system and the other end thereof is connected to the neutral wire input end of the power system. Thus, when the power system is connected to a first light-emitting module having an electric shock protection circuit and the first light-emitting module is connected to one or more second light-emitting modules in parallel, the capacitive component can discharge the current sampling point of the electric shock protection circuit. Therefore, the current passing through the current sampling point will never be influenced by the lengths and sizes of the wires. This mechanism can effectively prevent the electric shock protection circuits of light-emitting modules from being mistakenly triggered when these light-emitting modules are connected to each other in parallel, so these light-emitting modules can normally operate.

(2) According to one embodiment of the present invention, the power system can effectively prevent the electric shock protection circuits of the light-emitting modules from being mistakenly triggered when these light-emitting modules are connected to each other in parallel, but the electric shock protection circuits can still be normally triggered to perform the electric shock protection function when a human body resistance is connected to the power grid. Therefore, the electric shock protection circuits can normally operate.

(3) According to one embodiment of the present invention, the power system can be applicable to various LED lighting devices, so the power system can achieve energy-saving and the application thereof can be more comprehensive. Therefore, the power system meets the requirements of the future tendency.

(4) According to one embodiment of the present invention, the design of the power system is simple, so the power system can achieve the desired technical effects without significantly increasing the cost. Accordingly, the power system can conform to the actual requirements.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
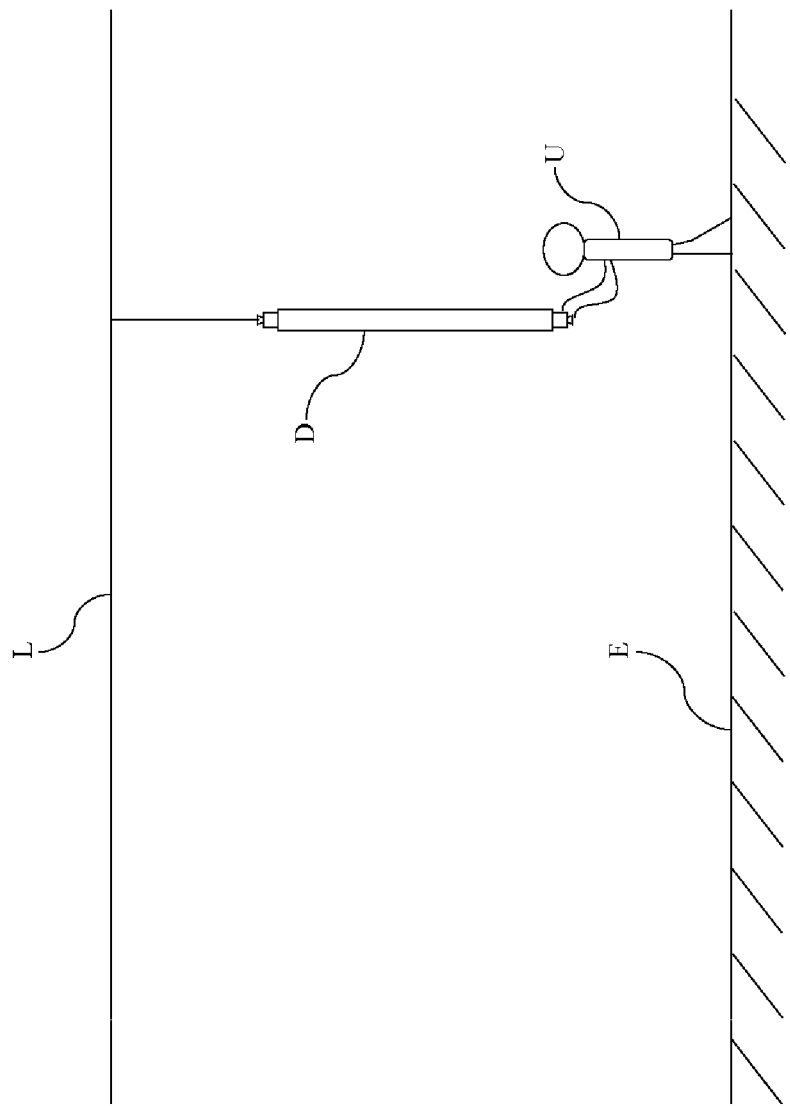
FIG. 1 is a schematic view of installing a currently available lighting device on a lamp holder.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
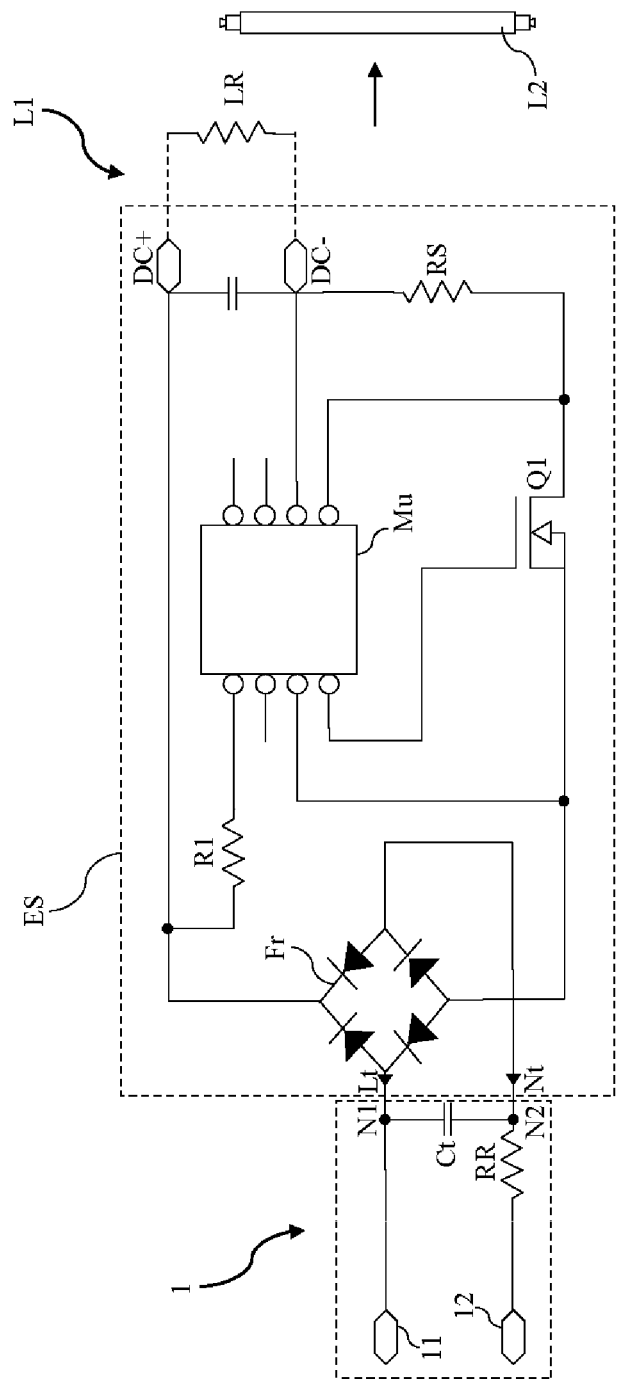
FIG. 2 is a schematic view of a power system capable of preventing from mistakenly triggering the electric shock protection function of a lamp tube in accordance with a first embodiment of the present invention (the power system is connected to one or more lighting devices).

Please refer to FIG. 2, which is a schematic view of a power system capable of preventing from mistakenly triggering the electric shock protection function of a lamp tube in accordance with a first embodiment of the present invention. This embodiment illustrates that the power system is connected to one or more lighting devices. As shown in FIG. 2, the power system 1 includes a live wire input end 11, a neutral wire input end 12 and a capacitive component Ct. In one embodiment, the power system 1 may be a lamp holder, a socket connected to a power grid (mains supply) or other similar systems. The live wire terminal and the neutral wire terminal of a light-emitting module can be inserted into the corresponding input ends of the power system 1. Then the light-emitting module can be powered by the electricity outputted by the power system 1 connected to the power grid.

The live wire input end 11 is connected to a first node N1. The first light-emitting module L1 includes an electric shock protection circuit ES and a load LR. In one embodiment, the first light-emitting module L1 may be, but not limited to, a light-emitting diode (LED) lamp tube, an LED bulb, or any currently available LED lighting devices; the load LR may be, but not limited to, an LED, an LED array or any currently available LED devices having LED driving circuits or control circuits. The first node N1 is connected to the live wire terminal Lt of the electric shock protection circuit ES of the first light-emitting module L1.

The neutral wire input end 12 is connected to a second node N2. The second node N2 is used to connect to the neutral wire terminal Nt of the electric shock protection circuit ES of the first light-emitting module L1.

One end of the capacitive component Ct is connected to the first node N1 and the other end of the capacitive component Ct is connected to the second node N2. In one embodiment, the capacitive component Ct may be, but not limited to, an energy storing component, such as a capacitor, the combination of at least one capacitor and at least one inductor, etc.

Besides, the power system 1 may further include a voltage transformation module. The live wire input end 11 and the neutral wire input end 12 are connected to the first node N1 and the second node N2 via the voltage transformation module respectively. Thus, the voltage transformation module can perform transformation for the voltage inputted from the live wire input end 11 and the neutral wire input end 12 so as to drive the first light-emitting module L1. In one embodiment, the voltage transformation module may be, but not limited to, a transformer or other similar devices.

The electric shock protection circuit ES of the first light-emitting module L1 includes a live wire terminal Lt, a neutral wire terminal Nt, a bridge rectifier Fr, a controller Mu, a resistor R1, a resistor RS, a switch Q1, a positive output terminal DC+ and a negative output terminal DC−. The resistor RS serves as a current sampling point. In one embodiment, the switch Q1 may be, but not limited to, a metal-oxide-semiconductor field-effect transistor (MOS), a bipolar junction transistor (BJT) or other similar devices. The above elements are connected to each other, and the electric shock protection circuit ES is connected to the load LR via the positive output terminal DC+ and the negative output terminal DC−. Moreover, an equivalent resistance RR can be considered formed between the neutral wire input end 12 of the power system 1 and the neutral wire terminal Nt of the electric shock protection circuit ES. The equivalent resistance RR is substantially equal to the internal resistance of the first light-emitting module L1 (the internal resistance varies with the lengths and the sizes of the wires inside the first light-emitting module L1).

The following content specifically describes the operational mechanism of the electric shock protection circuit ES. When the first light-emitting module L1 is connected to the power system 1, the controller Mu turns on the switch Q1 with a view to drive the first light-emitting module L1.

Meanwhile, the controller Mu detects the current passing through the resistor RS and compares the current with a predetermined value. When the current reaches the predetermined value, the controller Mu determines that the human body resistance has not connected to the power grid yet, so the controller Mu remains the on-state of the switch Q1.

When the user touches the neutral wire terminal Nt of the first light-emitting module L1 (the human body resistance has connected to the power grid), the controller Mu detects that the current passing through the resistor RS is less than the predetermined value (now, the equivalent resistance RR is about the sum of the internal resistance of the first light-emitting module L1 and the human body resistance). At the moment, the controller Mu determines that the human body resistance has connected to the power grid, so the controller Mu turns off the switch Q1 so as to prevent the user from getting electric shock. As described above, the electric shock protection circuit ES determines whether the human body resistance is connected to the power grid or not by detecting the current passing through the resistance RS in order to implement the electric shock protection function.

However, when the first light-emitting module L1 is connected to one or more second light-emitting modules L2 in parallel (the first light-emitting module L1 and the second light-emitting modules L2 may be the same lighting devices or different lighting devices), the lengths of the wires may change, which causes the increase of the internal resistance of the whole loop. In this case, the controller Mu may mistakenly determine that the human body resistance has connected to the power grid and then turn off the switch Q1. Therefore, the first light-emitting module L1 and the second light-emitting modules L2 cannot normally operate.

The power system 1 according to the embodiment can effectively solve the above problem. As set forth above, one end of the capacitive component Ct is connected to the first node N1 and the other end thereof is connected to the second node N2. When the first light-emitting module L1 is connected to one or more second light-emitting modules L2 in parallel and is connected to the power system 1, the controller Mu turns on the switch Q1. In the meanwhile, the capacitive component Ct can discharge the resistor RS connected to the switch Q1 in series at the moment that the switch Q1 is turned on, such that the current passing through the resistor RS will not be influenced by the lengths and the sizes of the wires. The above special mechanism can effectively prevent from mistakenly triggering the electric shock protection circuit ES when several light-emitting modules are connected to each other in parallel. In this way, these light-emitting modules can normally operate.

Figure 3:
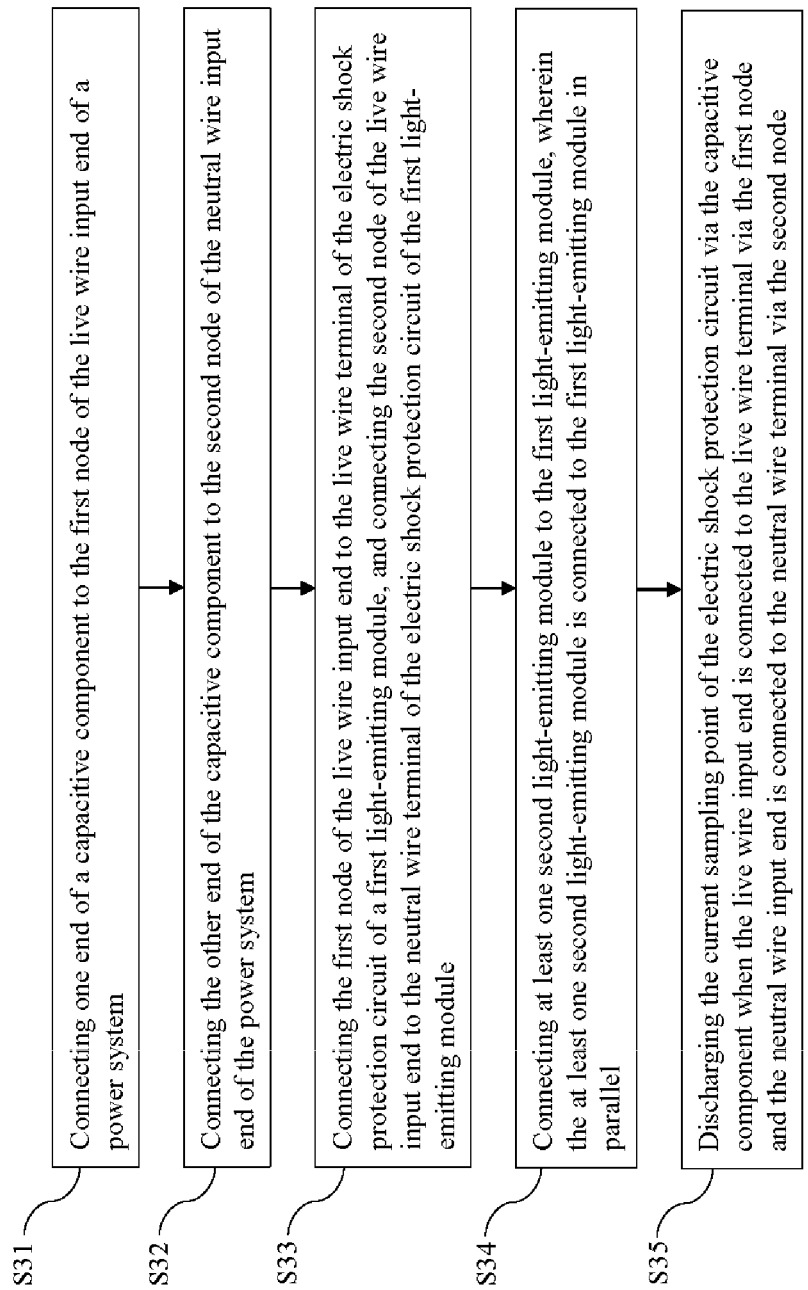
FIG. 3 is a flow chart of a method for preventing from mistakenly triggering the electric shock protection function of the lamp tube in accordance with the first embodiment of the present invention.

Please refer to FIG. 3, which is a flow chart of a method for preventing from mistakenly triggering the electric shock protection function of the lamp tube in accordance with the first embodiment of the present invention. The method includes the following steps:

Step S31: connecting one end of a capacitive component to the first node of the live wire input end of a power system.

Step S32: connecting the other end of the capacitive component to the second node of the neutral wire input end of the power system.

Step S33: connecting the first node of the live wire input end to the live wire terminal of the electric shock protection circuit of a first light-emitting module, and connecting the second node of the live wire input end to the neutral wire terminal of the electric shock protection circuit of the first light-emitting module.

Step S34: connecting at least one second light-emitting module to the first light-emitting module, wherein the at least one second light-emitting module is connected to the first light-emitting module in parallel.

Step S35: discharging the current sampling point of the electric shock protection circuit via the capacitive component when the live wire input end is connected to the live wire terminal via the first node and the neutral wire input end is connected to the neutral wire terminal via the second node.

The embodiment just exemplifies the present invention and is not intended to limit the scope of the present invention; any equivalent modification and variation according to the spirit of the present invention is to be also included within the scope of the following claims and their equivalents.

It is worthy to point out that the electric shock protection circuit of a currently available lighting device may be mistakenly triggered when the lighting device is connected to other lighting devices in parallel, so these lighting devices cannot normally operate. On the contrary, according to one embodiment of the present invention, the power system has a capacitive component; one end of the capacitive component is connected to the live wire input end of the power system and the other end thereof is connected to the neutral wire input end of the power system. Thus, when the power system is connected to a first light-emitting module having an electric shock protection circuit and the first light-emitting module is connected to one or more second light-emitting modules in parallel, the capacitive component can discharge the current sampling point of the electric shock protection circuit. Therefore, the current passing through the current sampling point will never be influenced by the lengths and sizes of the wires. This mechanism can effectively prevent the electric shock protection circuits of light-emitting modules from being mistakenly triggered when these light-emitting modules are connected to each other in parallel, so these light-emitting modules can normally operate.

Besides, according to one embodiment of the present invention, the power system can effectively prevent the electric shock protection circuits of the light-emitting modules from being mistakenly triggered when these light-emitting modules are connected to each other in parallel, but the electric shock protection circuits can still be normally triggered to perform the electric shock protection function when a human body resistance is connected to the power grid. Therefore, the electric shock protection circuits can normally operate.

Moreover, according to one embodiment of the present invention, the power system can be applicable to various LED lighting devices, so the power system can achieve energy-saving and the application thereof can be more comprehensive. Therefore, the power system meets the requirements of the future tendency.

Furthermore, according to one embodiment of the present invention, the design of the power system is simple, so the power system can achieve the desired technical effects without significantly increasing the cost. Accordingly, the power system can conform to the actual requirements.

Figure 4:
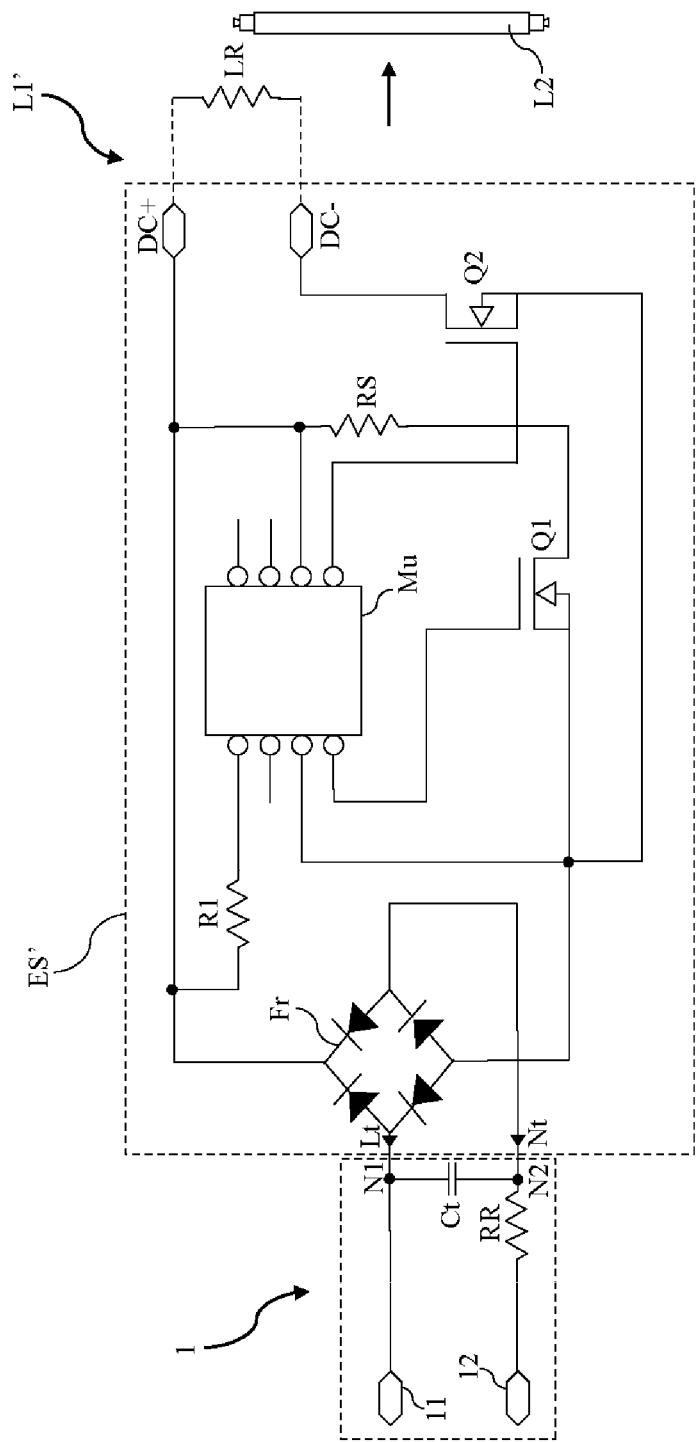
FIG. 4 is a schematic view of a power system capable of preventing from mistakenly triggering the electric shock protection function of a lamp tube in accordance with a second embodiment of the present invention (the power system is connected to one or more lighting devices).

Please refer to FIG. 4, which is a schematic view of a power system capable of preventing from mistakenly triggering the electric shock protection function of a lamp tube in accordance with a second embodiment of the present invention. This embodiment illustrates that the power system 1 is connected to one or more lighting devices. As shown in FIG. 4, the power system 1 includes a live wire input end 11, a neutral wire input end 12 and a capacitive component Ct.

The live wire input end 11 is connected to a first node N1. The first light-emitting module L1' includes an electric shock protection circuit ES and a load LR. The first node N1 is connected to the live wire terminal Lt of the electric shock protection circuit ES' of the first light-emitting module L1'.

The neutral wire input end 12 is connected to a second node N2. The second node N2 is used to connect to the neutral wire terminal Nt of the electric shock protection circuit ES' of the first light-emitting module L1.

One end of the capacitive component Ct is connected to the first node N1 and the other end of the capacitive component Ct is connected to the second node N2.

Similarly, the power system 1 may further include a voltage transformation module. The live wire input end 11 and the neutral wire input end 12 are connected to the first node N1 and the second node N2 via the voltage transformation module respectively. Thus, the voltage transformation module can perform transformation for the voltage inputted from the live wire input end 11 and the neutral wire input end 12 in order to drive the first light-emitting module L1'.

The electric shock protection circuit ES' of the first light-emitting module L1' includes a live wire terminal Lt, a neutral wire terminal Nt, a bridge rectifier Fr, a controller Mu, a resistor R1, a resistor RS, a switch Q1, a switch Q2, a positive output terminal DC+ and a negative output terminal DC-. The resistor RS serves as a current sampling point. In one embodiment, the switch Q1 and the switch Q2 may be, but not limited to, metal-oxide-semiconductor field-effect transistors (MOS), bipolar junction transistors (BJT) or other similar devices.

The following content specifically describes the operational mechanism of the electric shock protection circuit ES. When the first light-emitting module L1' is connected to the power system 1, the controller Mu turns on the switch Q1 and the switch Q2 with a view to drive the first light-emitting module L1'. Meanwhile, the controller Mu detects the current passing through the resistor RS and compares the current with a predetermined value. When the current reaches the predetermined value, the controller Mu determines that the human body resistance has not connected to the power grid yet, so the controller Mu remains the on-state of the switch Q2.

When the user touches the neutral wire terminal Nt of the first light-emitting module L1' (the human body resistance has connected to the power grid), the controller Mu detects that the current passing through the resistor RS is less than the predetermined value. At the moment, the controller Mu determines that the human body resistance has connected to the power grid, so the controller Mu turns off the switch Q2 so as to prevent the user from getting electric shock.

Similarly, when the first light-emitting module L1' is connected to one or more second light-emitting modules L2 in parallel and these light-emitting modules are driven by the power system 1, the controller Mu turns on the switch Q1 and the switch Q2. In the meanwhile, the capacitive component Ct can discharge the resistor RS connected to the switch Q1 in series at the moment that the switch Q1 and the switch Q2 are turned on, such that the current passing through the resistor RS will not be influenced by the lengths and the sizes of the wires. As set forth above, the currently available electric shock protection circuits determine whether the human body resistance is connected to the power grid or not by detecting the current sampling point (such as the resistor RS in the embodiment) in the loop. Accordingly, when the wires connecting the power grid to the light-emitting modules are thin or there are many light-emitting modules in the power grid, the current passing through the current sampling point may be less than the predetermined value. The power system 1 according to the embodiment can effectively solve the problem by making the current passing the current sampling point be less than the predetermined value. Therefore, the power system 1 can be appliable to various electric shock protection circuits with different circuit designs.

The embodiment just exemplifies the present invention and is not intended to limit the scope of the present invention; any equivalent modification and variation according to the spirit of the present invention is to be also included within the scope of the following claims and their equivalents.

Figure 5:
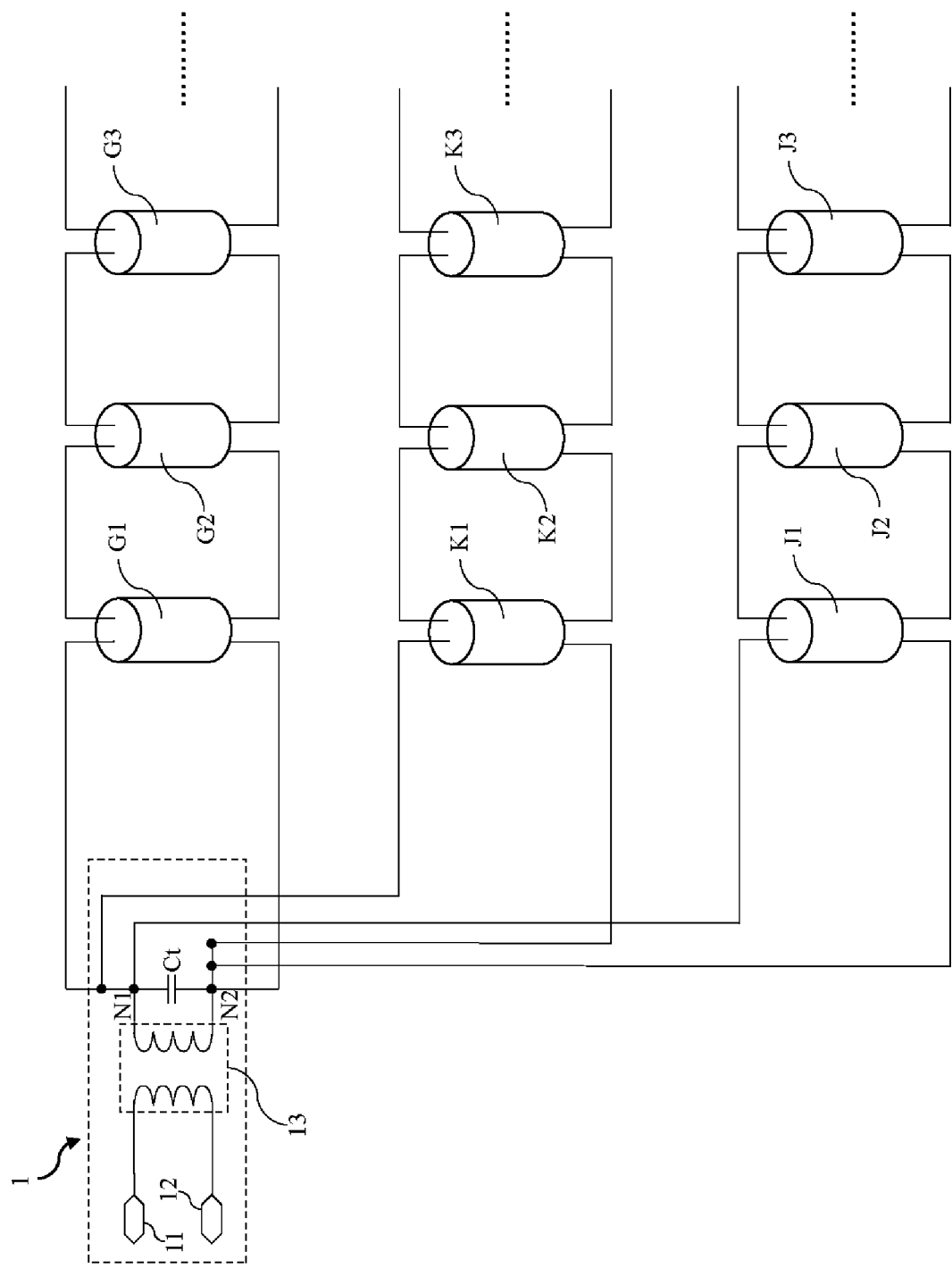
FIG. 5 is a schematic view of a power system capable of preventing from mistakenly triggering the electric shock protection function of a lamp tube in accordance with a third embodiment of the present invention (the power system is connected to one or more lighting devices).

Please refer to FIG. 5, which is a schematic view of a power system capable of preventing from mistakenly triggering the electric shock protection function of a lamp tube in accordance with a third embodiment of the present invention. This embodiment illustrates that the power system 1 is connected to one or more lighting devices. As shown in FIG. 5, the power system 1 includes a live wire input end 11, a neutral wire input end 12, a voltage transformation module 13 and a capacitive component Ct. There are several light-emitting module groups inside a power grid. The light-emitting modules G1, G2, G3 are the first group; the light-emitting modules G1, G2, G3 are connected to each other in parallel. The light-emitting modules K1, K2, K3 are the second group; the light-emitting modules K1, K2, K3 are connected to each other in parallel. The light-emitting modules J1, J2, J3 are the third group; the light-emitting modules J1, J2, J3 are connected to each other in parallel. These light-emitting modules are the same lighting devices or different lighting devices.

The live wire input end 11 is connected to a first node N1 via the voltage transformation module 13 and the neutral wire input end 12 is connected to a second node N2 via the voltage transformation module 13. The first node N1 and the second node N2 are connected to the live wire terminal and the neutral wire terminal of the light-emitting module G1, the live wire terminal and the neutral wire terminal of the light-emitting module K1, and the live wire terminal and the neutral wire terminal of the light-emitting module J1 respectively. In this way, the power system 1 can be connected to several light-emitting module groups and each of the light-emitting module groups includes a plurality of light-emitting modules connected to each other in parallel. Compared with the previous embodiments, the power system according to this embodiment is connected to more light-emitting modules, so the capacity of the capacitive component Ct also needs to be increased.

The embodiment just exemplifies the present invention and is not intended to limit the scope of the present invention; any equivalent modification and variation according to the spirit of the present invention is to be also included within the scope of the following claims and their equivalents.

Figure 6:
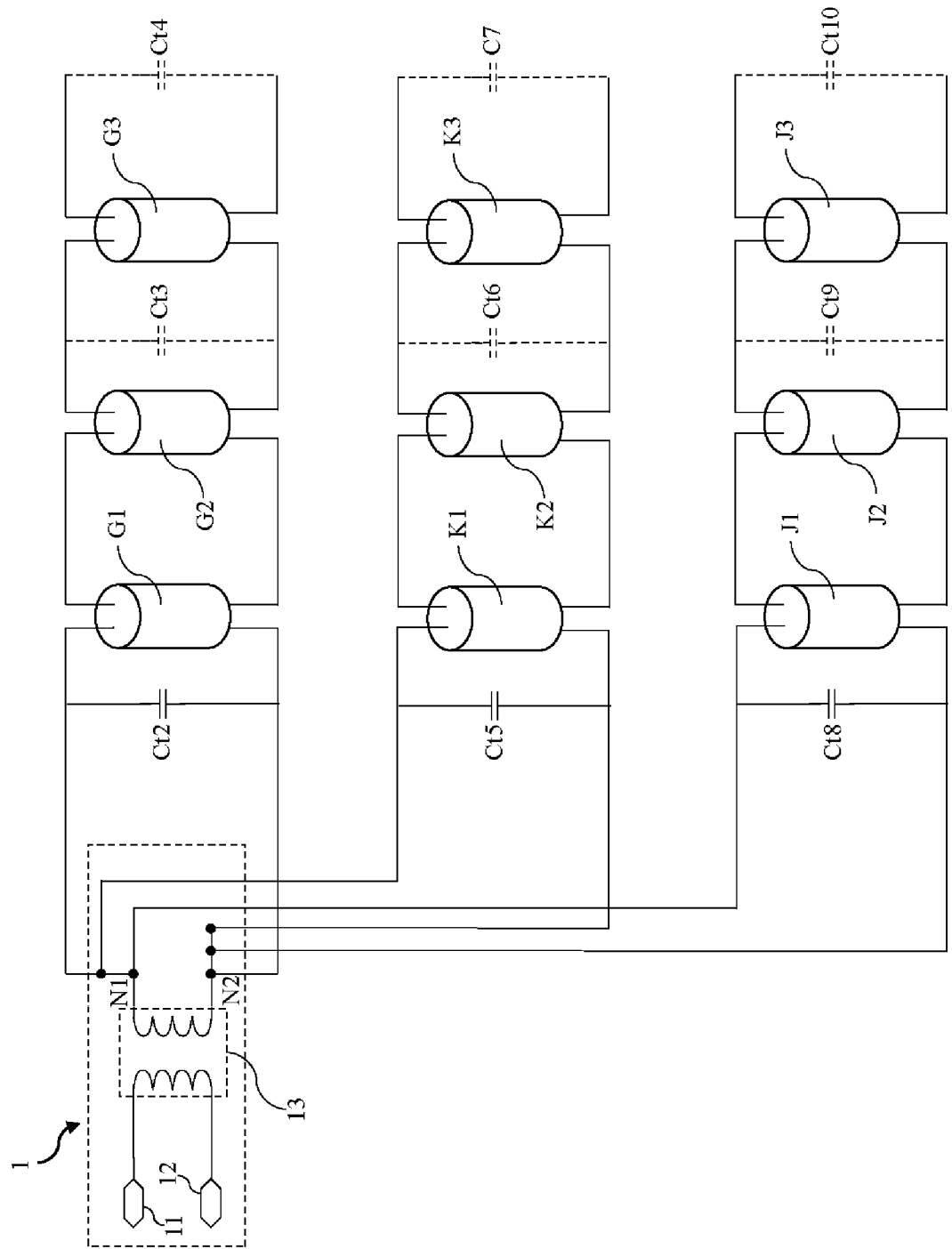
FIG. 6 is a schematic view of a power system capable of preventing from mistakenly triggering the electric shock protection function of a lamp tube in accordance with a fourth embodiment of the present invention (the power system is connected to one or more lighting devices).

Please refer to FIG. 6, which is a schematic view of a power system capable of preventing from mistakenly triggering the electric shock protection function of a lamp tube in accordance with a fourth embodiment of the present invention. This embodiment illustrates that the power system 1 is connected to one or more lighting devices. As shown in FIG. 6, the power system 1 includes a live wire input end 11, a neutral wire input end 12 and a voltage transformation module 13.

The above elements are similar to those of the previous embodiments, so will not be described herein again. The difference between this embodiment and the previous embodiments is that the power system 1 of this embodiment includes a plurality of capacitive components Ct2, Ct5, Ct8. The capacitive components Ct2, Ct5, Ct8 are disposed at the positions adjacent to the light-emitting modules G1, K1, J1. The embodiment replaces the high-capacity capacitive component Ct by several low-capacity capacitive components Ct2, Ct5, Ct8.

The capacitive components Ct2, Ct5, Ct8 can be replaced by the capacitive components Ct3, Ct6, Ct9. The capacitive components Ct3, Ct6, Ct9 are disposed at the positions adjacent to the light-emitting modules G2, K2, J2.

The capacitive components Ct3, Ct6, Ct7 can be replaced by the capacitive components Ct4, Ct7, Ct10. The capacitive components Ct4, Ct7, Ct10 are disposed at the positions adjacent to the light-emitting modules G3, K3, J3.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the power system has a capacitive component; one end of the capacitive component is connected to the live wire input end of the power system and the other end thereof is connected to the neutral wire input end of the power system. Thus, when the power system is connected to a first light-emitting module having an electric shock protection circuit and the first light-emitting module is connected to one or more second light-emitting modules in parallel, the capacitive component can discharge the current sampling point of the electric shock protection circuit. Therefore, the current passing through the current sampling point will never be influenced by the lengths and sizes of the wires. This mechanism can effectively prevent the electric shock protection circuits of light-emitting modules from being mistakenly triggered when these light-emitting modules are connected to each other in parallel, so these light-emitting modules can normally operate.

Besides, according to one embodiment of the present invention, the power system can effectively prevent the electric shock protection circuits of the light-emitting modules from being mistakenly triggered when these light-emitting modules are connected to each other in parallel, but the electric shock protection circuits can still be normally triggered to perform the electric shock protection function when a human body resistance is connected to the power grid. Therefore, the electric shock protection circuits can normally operate.

Moreover, according to one embodiment of the present invention, the power system can be applicable to various LED lighting devices, so the power system can achieve energy-saving and the application thereof can be more comprehensive. Therefore, the power system meets the requirements of the future tendency.

Furthermore, according to one embodiment of the present invention, the design of the power system is simple, so the power system can achieve the desired technical effects without significantly increasing the cost. Accordingly, the power system can conform to the actual requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for preventing from mistakenly triggering an electric shock protection function of a lamp tube, comprising:
   connecting one end of a capacitive component to a first node of a live wire input end of a power system;
   connecting the other end of the capacitive component to a second node of a neutral wire input end of the power system;
   connecting the first node of the live wire input end to a live wire terminal of an electric shock protection circuit of a first light-emitting module, and connecting the second node of the live wire input end to a neutral wire terminal of the electric shock protection circuit of the first light-emitting module, wherein the electric shock protection circuit comprises a bridge rectifier, a switch, a positive output terminal, a negative electrode terminal and a current sampling point, wherein the live wire input end is connected to a first end of the bridge rectifier via the live wire terminal, the neutral wire input end is connected to a second end of the bridge rectifier via the neutral wire terminal, a third end of the bridge rectifier is connected to the positive output terminal, a fourth end of the bridge rectifier is connected to one end of the current sampling point via the switch, and another end the current sampling point is connected to the negative output terminal, wherein the current sampling point is a resistor; and
   discharging the current sampling point of the electric shock protection circuit via the capacitive component when the live wire input end is connected to the live wire terminal via the first node and the neutral wire input end is connected to the neutral wire terminal via the second node.

2. The method for preventing from mistakenly triggering the electric shock protection function of the lamp tube of claim 1, further comprising:
   connecting at least one second light-emitting module to the first light-emitting module, wherein the at least one second light-emitting module is connected to the first light-emitting module in parallel.

3. The method for preventing from mistakenly triggering the electric shock protection function of the lamp tube of claim 2, wherein the first light-emitting module and the at least one second light-emitting module are light-emitting diode lamp tubes.

4. The method for preventing from mistakenly triggering the electric shock protection function of the lamp tube of claim 1, wherein the live wire input end and the neutral wire input end are connected to the first node and the second node via a voltage transformation module respectively.

* * * * *